Nov. 11, 1969   A. HEILIG ET AL   3,477,482
DEVICE FOR DEBARKING TREE TRUNKS
Filed Jan. 23, 1968   6 Sheets-Sheet 1

Inventors:
Alfred Heilig
Gerhard Zerrer
By

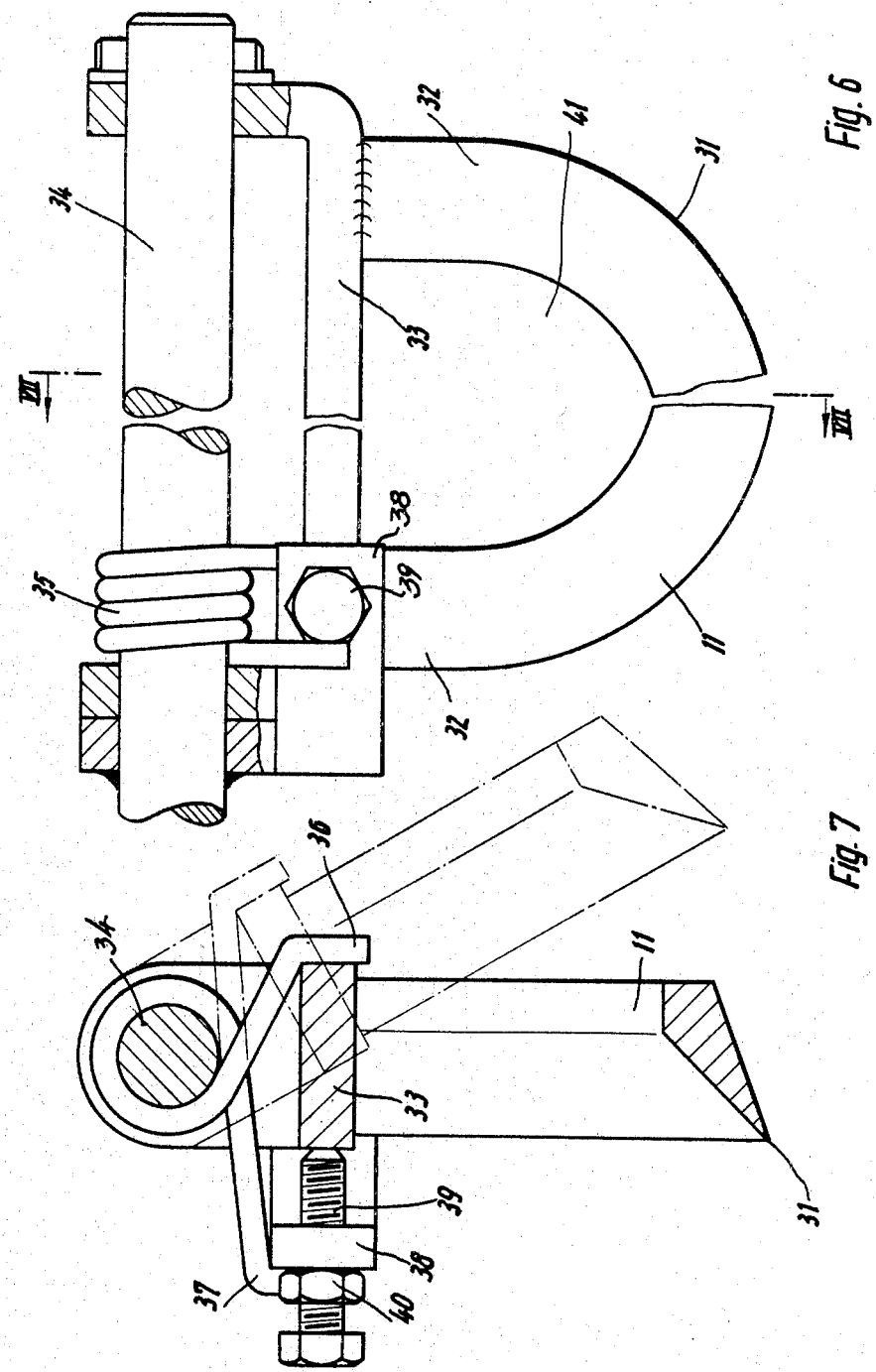

Nov. 11, 1969  A. HEILIG ET AL  3,477,482
DEVICE FOR DEBARKING TREE TRUNKS
Filed Jan. 23, 1968  6 Sheets-Sheet 6

Inventors:
Alfred Heilig
Gerhard Zorrer
By Walter Becker

United States Patent Office 3,477,482
Patented Nov. 11, 1969

3,477,482
DEVICE FOR DEBARKING TREE TRUNKS
Alfred Heilig, Gailingen Kreis Constance, and Gerhard Zerrer, Korb, Germany, assignors, by mesne assignments, to Otto Jackle, Schlatt am Randen, Germany
Filed Jan. 23, 1968, Ser. No. 699,871
Claims priority, application Germany, Jan. 25, 1967, St 26,408
Int. Cl. B27l 1/00
U.S. Cl. 144—208       20 Claims

ABSTRACT OF THE DISCLOSURE

An apparatus for debarking tree trunks, which includes a frame carrying two rows of spring urged levers with peeling knives which are so arranged that when the frame is pulled over and in the longitudinal direction of the trunk to be debarked, the knives respectively pertaining to said rows of levers and occupying their peeling positions will be located on opposite sides of the central longitudinal vertical plane of symmetry of the trunk and a projection of said knives of said two rows of levers upon a plane perpendicular to said central vertical plane of symmetry will describe a portion of at least approximately the circumferential contour of the trunk being debarked.

---

The present invention relates to a device for debarking tree trunks which comprises at least one peeling knife which is movable in longitudinal direction of and over the trunk. The debarking of tree trunks still causes difficulties, particularly when the debarking operation is to be effected at the place where the trees are felled. As a rule, the trees are debarked by hand by means of a peeling knife at the place where the trees are felled.

Also motor-operated devices are known which are manually guided over the trunk for purposes of debarking the same. However, the output of such devices is, as a rule, not higher than when the debarking is effected manually by hand-operated peeling knives.

Additionally, devices are known according to which motor-operated rotatable milling tools are arranged adjacent and in series along a circle around the trunk. Such devices, which completely chip the bark, are relatively complicated in structure and require relatively high power. Such chip removing devices have the advantage over peeling knives that they are far more sturdy and can easily be operated.

It is an object of the present invention to provide a device of the above mentioned type employing peeling knives in such a way that a fast and simple debarking of tree trunks will be possible also at the place where the trees are felled.

It is another object of the present invention to provide a device as set forth in the preceding paragraph which will make it possible to debark tree trunks with highly different cross sections equally well over a relatively large circumferential section.

Still another object of this invention consists in the provision of a device as set forth in the preceding paragraphs, which will assure a good continuous removal and flow of the bark being removed.

Finally it is an object of this invention to provide a device as outlined above which will be simple in construction and relatively inexpensive to manufacture.

These and other objects and advantages of the invention will appear more clearly from the following specification in connection with the accompanying drawings, in which:

FIG. 1 diagrammatically illustrates a front view of a debarking device according to the present invention.

FIG. 6 shows a peeling knife on an enlarged scale.

FIG. 7 is a section taken along the line VII—VII of FIG. 6.

Figure 1:
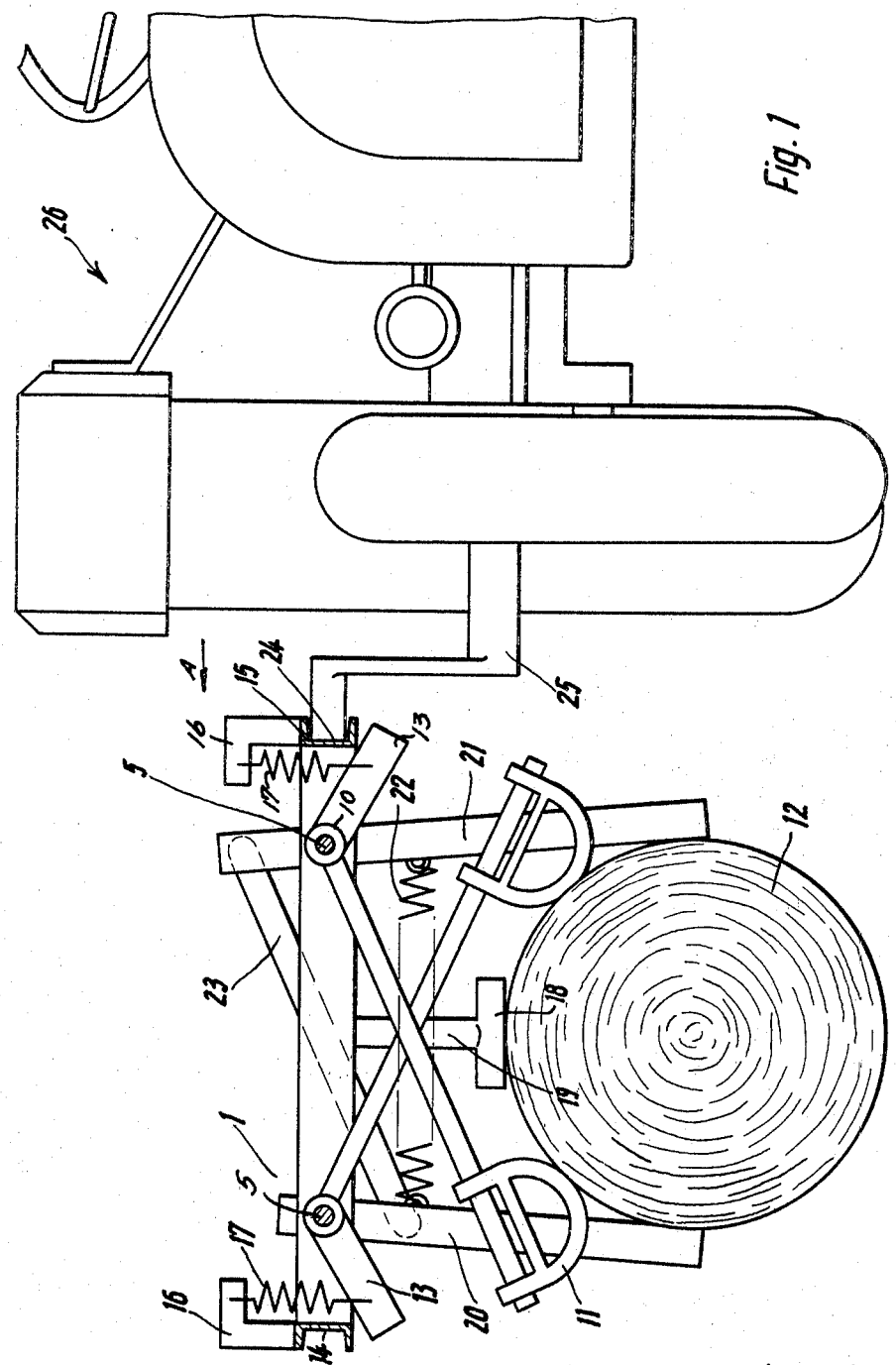

A device for debarking tree trunks according to the invention with at least one peeling knife movable along and over the tree trunk to be debarked is characterized primarily in that a plurality of adjacent and serially arranged peeling knives is supported by levers which are spring loaded so as to be urged to the working surface and are pivotally connected to a frame, said peeling knives when viewed in the longitudinal direction of the tree trunks to be debarked surrounding a portion of the curved trunk surface so that the latter in at least one position of said knives surround the tree trunk in approximately uninterrupted manner.

In this way it is possible, when employing sturdy peeling knives, to debark a large circumferential area of a trunk while the peeling knives tiltable with the levers are able easily to adapt themselves to the respective surface contour of the tree being debarked.

It is particularly advantageous when a plurality of levers carrying the peeling knives is tiltable about a common axis extending in the direction of movement of the device and if said levers have a different length. With such a desgin, the peeling knives will, when using the device on a relatively thin tree with thin bark, be closer to each other than when using the device on a thick tree trunk which has a correspondingly thicker bark so that automatically the advantageous so-called collar peeling takes place according to which certain bast and bark portions are left on the trunk for protection thereof.

According to a further feature of the present invention, at least two parallel shafts with levers and peeling knives are arranged symmetrically with regard to a preferably vertical plane of symmetry adjacent to each other so that a particularly uniform de-barking of the tree trunk is obtained and the peeling knives exert a centering effect by which the device is centered relative to the tree trunk. This is particularly the case when the levers of the adjacent shafts cross each other when viewed in the direction of movement of the device.

In order to assure that the peeled chips flow off the tree in an advantageous manner, the longer levers in peeling direction of the device are located in front because the peeling knives thereof are located lower with regard to the circumference of the trunk to be debarked than the peeling knives of the shorter levers so that the deeper areas of the circumference of the tree will be debarked first and the thus formed peeling chips flow off first without impeding the peeling chips being formed further up.

The device may be designed in a very simple manner by arranging the levers with plugs in series on shafts fixedly arranged in the frame. With such a design it is possible to detach the levers in a simple manner from the frame and to provide a number of levers or peeling knives on the frame in conformity with the respective requirements.

The guiding of the device according to the invention along the tree trunk and the location of the peeling knives on the circumference of the trunk may be greatly improved by providing the frame with a preferably adjustable depth limiting device for support on the trunk to be debarked, said depth limiting device preferably being located in the plane of symmetry between the shafts of the levers.

A particularly satisfactory centering of the device with regard to the tree trunk is obtained by providing preferably the rear end of the frame with the centering device which at least partially surrounds the trunk to be debarked. Such centering device may be formed in a simple manner by two levers which are spring-urged toward the trunk and which are preferably automatically controlled and interconnected. These levers will in each position be located symmetrically with regard to the central plane of the device and thereby will hold said device in a predetermined position with regard to the longitudinal axis of the tree trunk to be debarked.

According to a further development of the present invention, the peeling knife is movable in the direction of its cutting edge and is preferably pivotally and under spring load connected to the lever so that the peeling knife will be able to move over impediments, such as branch stubs. This can be realized in a simple manner by making the peeling knife pivotable about the longitudinal axis of the respective lever and by arranging a helical torsion spring around the pivotal axis. Advantageously, the peeling position of the peeling knife is determined by an adjustable abutment, preferably in the form of a screw, by means of which the peeling position of the peeling knife can be adjusted to the respective requirements, as for instance, different types of wood.

A uniform overlapping of the debarking device in the direction of the debarking is obtained when the peeling knives have a convex, preferably partially circularly curved, cutting edge. The cutting edge of the peeling knife may, however, also be rectilinear or concave. In this instance the peeling knife is advantageously pivotable about an axis parallel to the direction of movement of the device and is pivotally connected to the lever end so that with different trunk diameters, the peeling knife will automatically adapt its position to the respective trunk diameter.

In order to assure that the peeled off bark will flow off easily, the peeling knife is within the area of the cutting edge provided with a passage for the peeled off chips so that the said chips will not accumulate in front of the peeling knife. Advantageously, in such an instance, the peeling knife is designed in the form of a preferably U-shaped frame.

The device according to the invention is particularly easily employed when the frame of the device is provided with a coupling for connection to a pulling machine, as for instance a power lifter of a tractor. In such an instance the device is by a corresponding design of the coupling so connected to the pulling machine that it will be able to move about a horizontal transverse axis and a vertical axis, but will not be able to move about its horizontal axis. In this way a good adaptation of the device to the trunk surface will be assured. Advantageously, the coupling is on that side which is remote from the centering device or at the front side, when looking in the direction of movement, so that the device is pulled over the trunk to be debarked.

Figure 2:
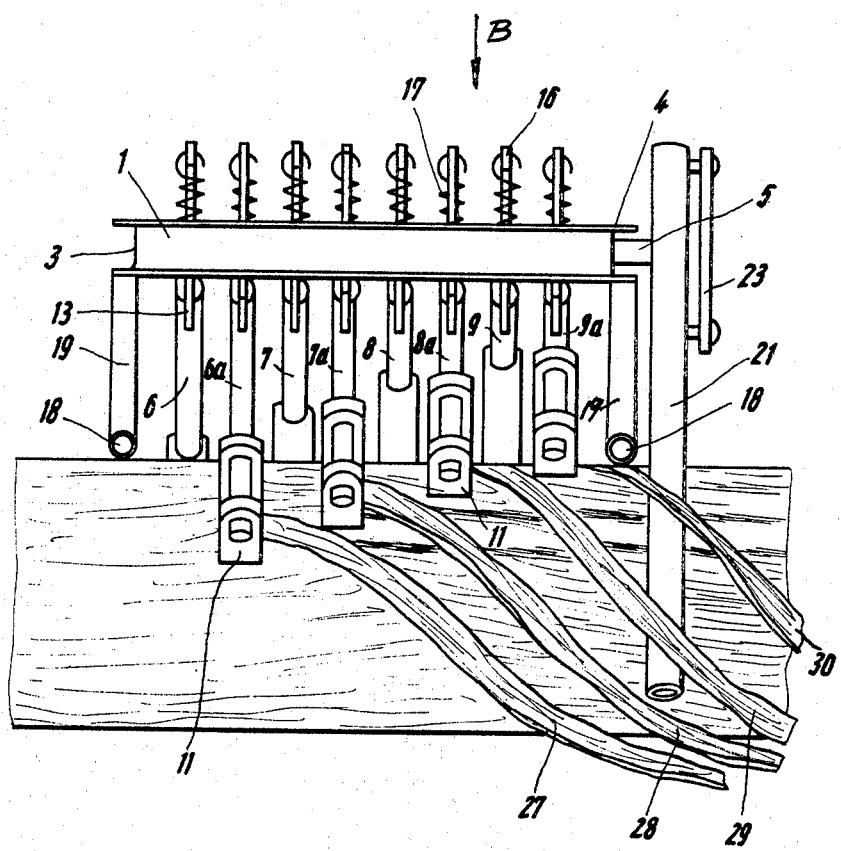
FIG. 2 shows the device of FIG. 1 as seen in the direction of the arrow A of FIG. 1.
Figure 3:
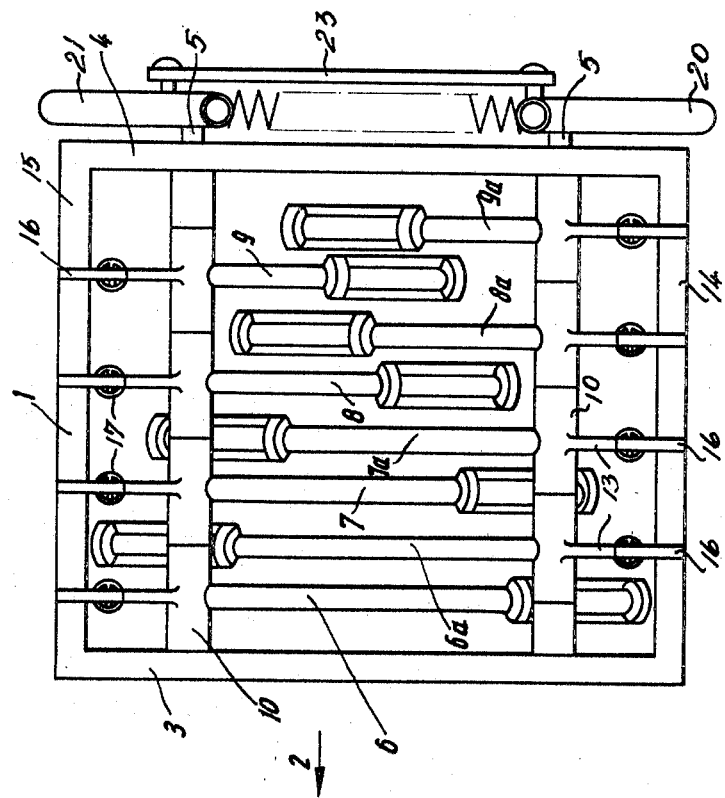
FIG. 3 is a top view of the device according to the invention as seen in the direction of the arrow B of FIG. 2.

Referring now to the drawings in detail, FIGS. 1 to 3 show a device according to the present invention with a rectangular frame 1. Located between the frame portions 3 and 4 are two shafts 5 which are parallel to the direction of movement indicated by the arrow 2. These shafts 5 are symmetrically arranged with regard to the vertical central plane of the frame 1 located in a horizontal plane. Mounted on the shafts 5 are levers 6–9, and 6a–9a, with bushings 10 in such a way that the levers can be tilted about the shafts 5. The serially arranged levers are alternately pivotally connected to the two shafts 5 while each two adjacent levers of each pair of levers 6, 6a; 7, 7a, etc. have the same length. The longest levers are provided in the front area of the frame 1 when looking in the direction of movement of the device as indicated by the arrow 2. The levers decrease in length toward the rear end of frame 1. As shown in FIG. 1, the levers extend from the respective shaft 5 at an incline downwardly to the other side of the frame 1 so that the extensions of the levers of the two parallel shafts, when looking in the direction of movement of the device indicated by the arrow 2, cross each other in the vertical plane of the device.

At the end of each lever there is arranged a peeling knife 11. The peeling knives 11, due to the different length of the levers 6–9; 6a–9a according to FIGS. 4 and 5 will, when viewed in the direction of movement of the device, extend around a circumferential area of the trunk 12 to be debarked in such a way that they are uniformly distributed over said circumferential area.

That side of the bushing 10 which points away from each lever is provided with a short lever arm 13 which extends below the respective adjacent longitudinal portion 15, 14 of frame 1 and is pivotally connected to an approximately vertical tension spring 17 which is connected to an arm 16 of frame 1. The springs 17 continously urge the peeling knives 11 toward the trunk 12 to be debarked. The distance between the lever arm 13 and the respective longitudinal frame portion 14, 15 is so selected that the lever arms 13 will in a predetermined inwardly tilted position of the peeling knives 11 abut the longitudinal frame portions 14, 15 and thereby fix this location. This brings about that the peeling knives 11 relatively easily also engage a tree trunk with relatively large diameter.

At the front and rear end of frame 1, the respective transverse frame portion 3, 4 has in the vertical central plane of frame 1 connected thereto a depth limiting device 18 by means of a vertical supporting arm 19. This depth limiting device 18 may, for instance, consist of a transverse pipe. The depth limiter 18 may be adjustable relative to frame 1 in a manner not illustrated.

Pivotally connected to the shafts 5 which extend through the rear transverse frame portion 4 at the rear end of frame 1, are centering levers 20, 21 which are interconnected below the pivot shafts 5 through a tension spring 22. Furthermore, the two centering levers 20, 21 are through the intervention of a linkage 23 interconnected in such a way that they automatically always occupy a position which is symmetrical to the vertical plane of the device. The linkage 23 is linked to levers 20, 21 and is located at opposite sides of the pivot shafts 5. In view of the centering levers 20, 21 which may, for instance, be formed by pipes and which extend around the trunk 12 within the area of the outermost sides, there will be assured a safe guiding or centering of the device relative to the trunk 12.

As will be seen from FIG. 1, the frame 1 is by means of a coupling 24 linked to the power lifter 25 of a pulling machine 26, for instance a tractor, in such a way that it is able to freely tilt about its horizontal transverse axis as well as about its vertical axis within certain limits relative to the power lifter 25. The coupling 24 is advantageously located in the front range of the frame 1 when looking in the direction of movement of the device as indicated by the arrow 2. The device according to the invention is by means of the pulling machine 26 pulled over the trunk 12 while the peeling knives 11, according to FIG. 2, cut off peeling chips 27–30. Inasmuch as the front levers 6, 6a, when viewed in the direction of movement of the device, are longer than the levers 7, 7a therebehind, which latter are again longer than the levers 8, 8a, etc., the first obtained front peeling chips 27 can flow off unimpeded by the peeling chips 28–30 further behind (see FIG. 2). By means of the peeling knives 11, a portion of the circumference of the trunk 7 is debarked in one operation.

Figure 4:
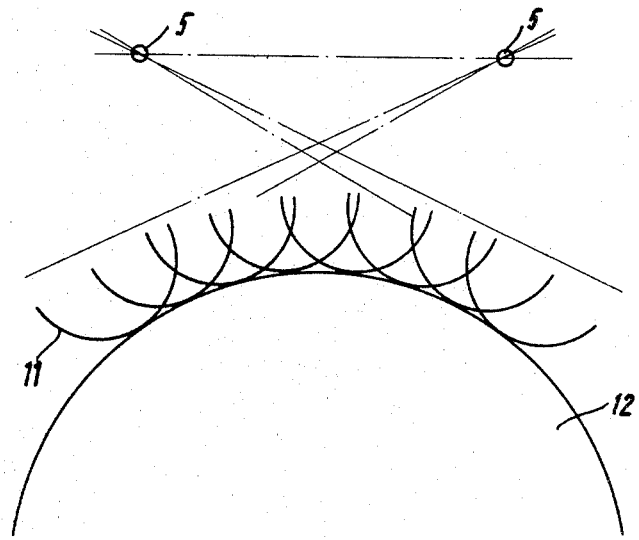
FIG. 4 is a diagrammatic illustration of the location of the peeling knives when used in connection with tree trunks of large cross section.
Figure 5:
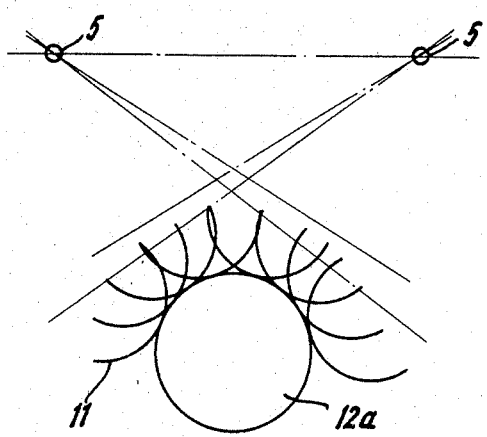
FIG. 5 is an illustration similar to that of FIG. 4 showing the location of the peeling knives with tree trunks of small cross section.

As shown in FIGS. 4 and 5, the peeling knives 11 are due to their tiltable mounting on the shafts 5 able to adapt themselves to the respective radius of curvature of the trunk 12, 12a. The arrangement of the levers carrying the peeling knives 11 will thus assure, when employing the device in connection with a trunk 12 of larger diameter, that the peeling knives 11 will be spaced further apart as shown in FIG. 4, whereas when employing the device according to the invention on a trunk 12a of smaller diameter, the peeling knives will be closer to each other as shown in FIG. 5.

With the embodiment of FIGS. 1–3, the peeling knives 11 are formed by U-shaped frame-like members in such a way that the cutting edge 31 of the peeling knives 11 form a portion of a circle. The legs 32 of the peeling knives 11 are connected to an arm 33 which extends transverse to the peeling knife 11. The arm 33 in its turn is pivotally connected to the cylindrical end 34 of the respective levers 6, 6a; 7, 7a. A helical torsion spring 35 extends around the cylindrical end 34 of the lever between the legs 33 and is located within the range of one leg 32 of the peeling knife 11. The spring 35 has one end 36 rest on the arm 33 while its other end 37 rests on a beam 38 which latter is welded to the end 34 of the lever. In view of the springs 35 respectively associated with the peeling knives 11, each peeling knife will in the cutting direction be urged by spring force toward its peeling position. The peeling position is determined by an abutment screw 39 threaded into the beam 38, said abutting screw 39 forming an abutment for the arm 33. A counter nut 40 arranged on the abutment screw 39 is secured by one end 37 of the helical torsion spring 35 so that said counter nut 40 can not accidentally detach itself. In view of the fact that the peeling knives 11 are able to pivot against the spring force acting thereupon, the said peeling knives are able to move over any encountered obstacles in which instance they will move into the position shown for instance by dot-dash lines in FIG. 7.

In view of the frame-shaped design of the peeling knife 11, the latter defines a passage 41 for the peeling chips.

Figure 8:
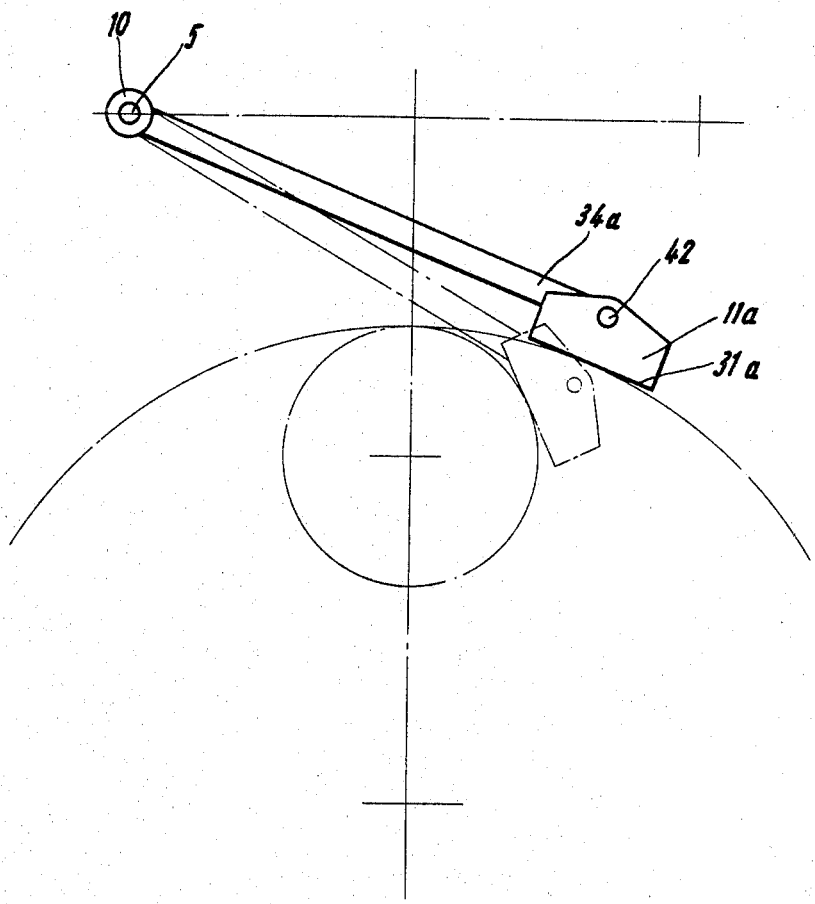
FIG. 8 shows a modified device according to the present invention in diagrammatic illustration.

According to the modification shown in FIG. 8, the peeling knife 11a is provided with a straight cutting edge 31a. With this embodiment, the peeling knife 11a is at the end 34 of the respective lever turnable about the shaft 5, pivotally arranged so as to be able to pivot about a shaft 42 which extends parallel to the direction of movement (arrow 2) of the device. As a result thereof, the peeling knife 11a can, as indicated in dot-dash lines in FIG. 8, adapt its position to the respective radius of curvature of the tree trunk to be debarked.

The peeling knives 11, 11a are advantageously easily detachably connected to the levers so that they can be exchanged for other peeling knives in a simple manner. Such other peeling knives may have different rake or clearance angles.

Preferably, when de-barking the trunk 12 with the device arranged laterally on the pulling machine 26, the debarking is effected from the thinner to the thicker end of the trunk on the ground so that the centering device 20, 21 can without difficulty be brought into engagement with the trunk. After a portion of the circumference of the trunk has been debarked, the trunk is turned by a corresponding angle and the next circumferential area is debarked from the thinner to the thicker end of the trunk.

It is, of course, to be understood that the persent invention is, by no means, limited to the particular embodiments shown in the drawings but also comprises any modifications within the scope of the appended claims.

What we claim is:

1. An apparatus debarking tree trunks, which includes: frame means movable over and along a tree trunk to be debarked, two rows of serially arranged spaced lever means respectively pivotally supported by said frame means and repsectively pivotable about two axes extending in the direction of the debarking movement of said apparatus and spaced from each other in the direction transverse to the direction of the debarking movement of said apparatus, two groups of peeling knives respectively supported by said lever means so as to be pivotable therewith, the peeling knives of each of said groups of knives when in peeling position being so arranged with regard to each other that a projection of each of said knives upon a plane parallel to the longitudinal axes of said lever means describes a portion of at least approximately the circumferential contour of the tree to be debarked, and spring means operatively connected to said lever means and continuously and yieldably urging the knives of one row of lever means in the direction toward the knives of the other row of lever means.

2. An apparatus according to claim 1, which includes first shaft means pivotally supporting all of the lever means of one row of lever means and also includes second shaft means pivotally supporting all of the lever means of the other row of lever means, each of the lever means of each row of lever means being pivotable independently of the other lever means of the same row of lever means, the lever means of each of said rows of lever means varying as to length progressively in the axial direction of said shafts.

3. An apparatus according to claim 2, in which said first and second shaft means are arranged opposite to and symmetrical with regard to a vertical plane of symmetry through said frame means, the lever means pivotally supported by said first shaft means being so arranged with regard to the lever means pivotally supported by said second shaft means as to cross each other.

4. An apparatus according to claim 2 in which each of the lever means of the majority of the lever means pivotally connected to said first shaft means extends between two lever means pivotally connected to the second shaft means.

5. An apparatus according to claim 1, which includes abutment means respectively associated with said lever means for limiting the movement of said peeling knives toward each other.

6. An apparatus according to claim 2, in which the length of the lever means of each of said rows of lever means increases in the direction of the de-barking movement of the apparatus.

7. An apparatus according to claim 1, which includes depth limiting means connected to said frame means for maintaining said frame means at a minimum height over the tree trunk to be debarked.

8. An apparatus according to claim 2, which includes depth limiting means arranged at the front and rear ends of said frame means for maintaining a minimum height of said frame means over the tree trunk to be debarked, said depth limiting means being located approximately along the plane of symmetry between said first and second shaft means.

9. An apparatus according to claim 1, which includes centering means arranged at one end of said frame means and at least partially extending around the tree trunk to be debarked.

10. An apparatus according to claim 9, in which said centering means is formed by said two spaced centering lever means pivotally connected to said frame means and interconnected by linkage means extending from one of said lever means at one side of the pivotal connection thereof to said frame means to a portion of the other centering lever means located on the other side of the pivotal connection of said last-mentioned lever means to said frame means, and spring means interconnecting said two lever means of said centering means and continuously urging the same toward each other.

11. An apparatus according to claim 10, in which said centering lever means are pivotally connected to said first and second shaft means respectively.

12. An apparatus according to claim 1, in which said peeling knives are respectively pivotally connected to the lever means supporting the same, and spring means associated with said peeling knives and urging the cutting edge thereof toward the tree trunk to be debarked.

13. An apparatus according to claim 1, in which each of said peeling knives is pivotable about the longitudinal axis of the lever means carrying said knife, and adjustable abutment means for adjusting the relative position of each peeling knife with regard to the lever means supporting same.

14. An apparatus according to claim 1, in which said peeling knives have a convex cutting edge.

15. An apparatus according to claim 1, in which said peeling knives have a straight cutting edge.

16. An apparatus according to claim 1, in which each of said peeling knives is pivotally supported by the respective lever means carrying the same for pivotal movement about an axis substantially parallel to the peeling movement of said device.

17. An apparatus according to claim 1, in which said peeling knives have a passage for passing peeled chips therethrough.

18. An apparatus according to claim 1, in which said peeling knives are of U-shape.

19. An apparatus according to claim 1, in which said peeling knives are detachably connected to the respective lever means supporting same.

20. An apparatus according to claim 1, which includes coupling means connected to said frame means for selective connection to pulling means.

References Cited
UNITED STATES PATENTS

| | | | |
|---|---|---|---|
| 2,575,422 | 11/1951 | Laulainen | 144—208 |
| 2,698,036 | 12/1954 | Hilborn | 144—208 |

ANDREW R. JUHASZ, Primary Examiner

GIL WEIDENFELD, Assistant Examiner